United States Patent [19]

Bandy, Jr.

[11] Patent Number: 5,232,068

[45] Date of Patent: Aug. 3, 1993

[54] REMOTE LUBRICATION SYSTEM FOR CONVEYOR BEARING

[75] Inventor: Clarence L. Bandy, Jr., Abingdon, Va.

[73] Assignee: American Longwall Mining Corporation, Abingdon, Va.

[21] Appl. No.: 835,561

[22] Filed: Feb. 14, 1992

[51] Int. Cl.⁵ .................................. F16N 13/22
[52] U.S. Cl. .................................. 184/12; 184/6; 184/15.1; 198/500; 384/475
[58] Field of Search .......... 184/12, 6, 105.3, 5, 184/8, 15.1; 384/474, 466, 434, 473, 475; 198/500, 501

[56] References Cited

U.S. PATENT DOCUMENTS

| | | | |
|---|---|---|---|
| 1,296,940 | 3/1919 | Fleming | 384/474 |
| 1,903,383 | 4/1933 | Winquist | 198/500 |
| 2,632,558 | 3/1953 | Mercier | 198/500 |
| 3,037,613 | 6/1962 | Harmon | 198/500 |
| 4,275,807 | 6/1981 | Mohn et al. | 198/500 |
| 4,346,801 | 8/1982 | Redder et al. | 198/500 |
| 5,001,377 | 3/1991 | Parkinson | 384/473 |
| 5,007,504 | 4/1991 | Hallbach | 184/5 |
| 5,027,940 | 7/1991 | Woodward | 198/500 |

FOREIGN PATENT DOCUMENTS

| | | | |
|---|---|---|---|
| 0537085 | 2/1957 | Canada | 384/474 |
| 2548861 | 5/1976 | Fed. Rep. of Germany | 384/474 |
| 2601798 | 7/1976 | Fed. Rep. of Germany | 384/474 |
| 0556063 | 7/1923 | France | 384/474 |
| 0478162 | 7/1975 | U.S.S.R. | 184/12 |

Primary Examiner—Ira S. Lazarus
Assistant Examiner—Alan B. Cariaso
Attorney, Agent, or Firm—King & Schickli

[57] ABSTRACT

A conveyor apparatus includes a drive unit with a drive sprocket assembly of an armored face conveyor having a central drive shaft for rotation within a lubricated bearing. A bearing housing encloses the bearing and includes an array of access ports circumferentially spaced around the perimeter. A split conveyor frame defines semicircular mounting rings for receiving the bearing housing and securely mounting the drive sprocket assembly. A lubricant channel is provided in the surface of one mounting ring, and the surface of the other mounting ring provides a lubricant seal. The lubricant channel aligns with the access ports of the bearing housing, and includes stopper plugs at each end to restrict the lubricant flow. A transfer tube having a lubricant fitting on a first end transversely extends across the conveyor assembly. A lubricant passage in the conveyor frame extends between the lubricant channel and a feed orifice of the transfer tube. Lubricant applied at the fitting is communicated through the transfer tube and lubricant passage to fill the lubricant channel. From the lubricant channel, lubricant is forced through the access ports of the bearing housing to effectively lubricate the internal bearing.

10 Claims, 2 Drawing Sheets

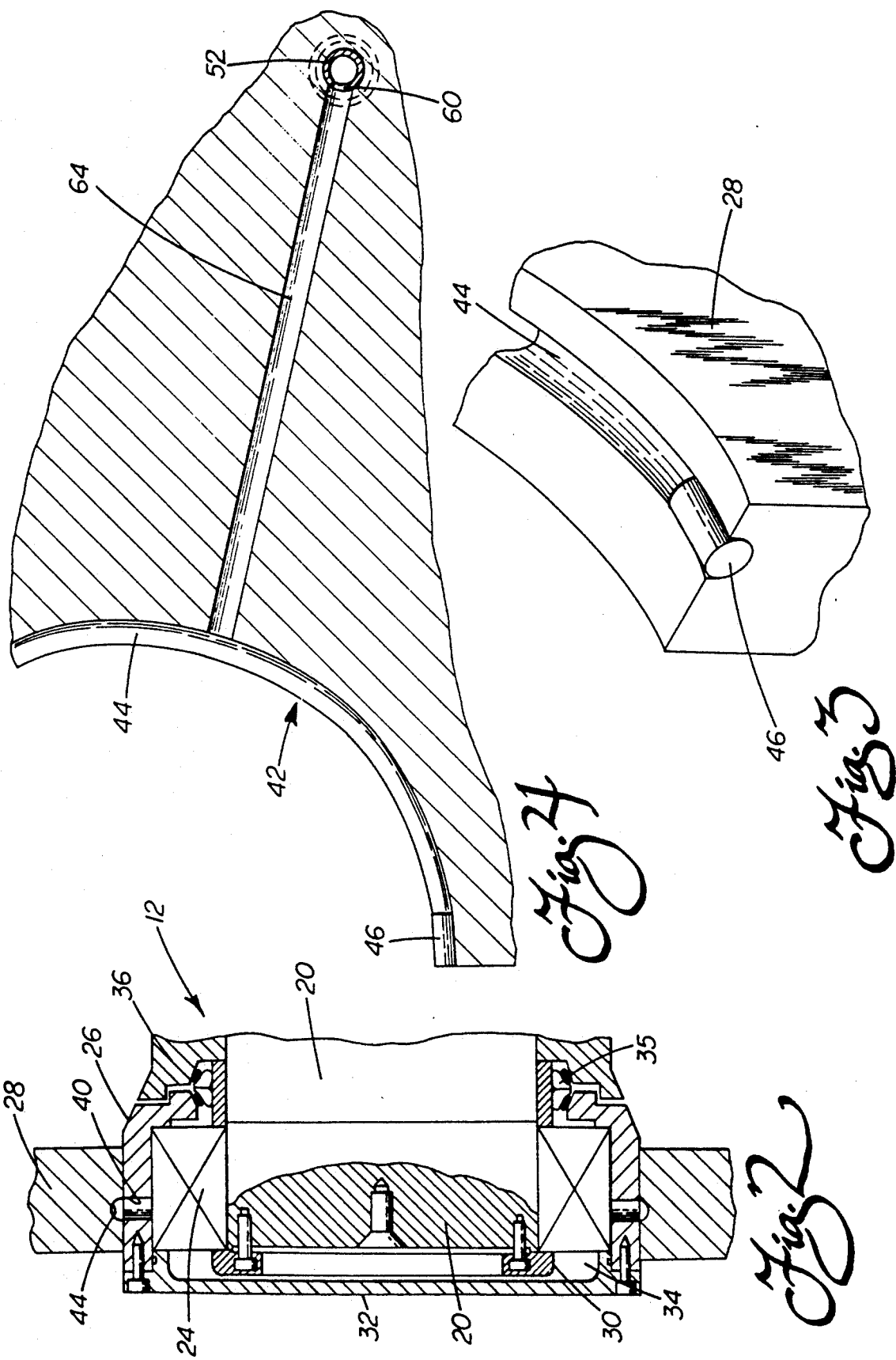

REMOTE LUBRICATION SYSTEM FOR CONVEYOR BEARING

TECHNICAL FIELD

The present invention relates generally to an endless conveyor apparatus for movement of aggregate material and, more particularly, to a system for lubricating the bearings in a drive or idler drum assembly providing improved performance and a longer service life of the conveyor apparatus.

BACKGROUND OF THE INVENTION

Endless conveyor systems are typically used in long wall mining of coal and the like. An armored face conveyor (AFC) receives the mined material as it is stripped from the mine face, and moves it to a delivery station where it is transferred to a series of other endless conveyors until eventually reaching the aboveground location for further processing and use. Drive sprockets and idler drums are incorporated for driving and supporting the AFC tail drive unit and other conveyor apparatus. Because of the hostile operating environment and the bulky nature of the mined materials, such conveyor apparatus are constructed with very durable, heavy duty components, including heavy gauge conveyor chains and flight bars. Even under the best of conditions, the various working components required to move and support the AFC chain and flight bars, especially the support shafts and bearings, are subject to considerable wear. This is due, in part, to the weight of the chain and the tremendous forces needed to move the heavy aggregate loads.

Regular and frequent lubrication of the bearings in the drive sprocket and idler drum assemblies of the tail drive unit is essential, in order to minimize this wear. It further promotes smooth and efficient operation of the conveyor apparatus. It can be appreciated that maintaining an adequate lubricant supply around the bearings not only serves to preserve the bearings themselves, but also extends the service life of other components in the conveyor system and minimizes the power requirements. For example, well lubricated bearings of the tail drive unit enable the drive sprocket assembly to more freely rotate. This, in turn, reduces the load on the drive motor that rotates the sprocket. Accordingly, the service life of the drive motor is effectively extended, and the electric power needed to drive the motor is of course reduced.

During a typical AFC mining operation, coal or other in situ material is dislodged from the mine face and free falls a short distance to land on the conveyor pan. To ensure that most of the dislodged material lands on the conveyor, the conveyor is positioned as close to the mine face as possible. Positioning the AFC tail drive unit adjacent to the face of the mine makes it extremely difficult to access the drive sprocket and idler drum bearings on the face side (i.e. side next to mine face) of the conveyor. This inaccessibility dictates that an increased conveyor down time is required each time the apparatus is shut down to lubricate the bearings. The time loss is unusually extended because of the rigorous procedures that must be followed to prevent a mishap as the operator awkwardly climbs over the conveyor apparatus while holding and operating a lubrication gun. Moreover, the down time factor is multiplied by the number of drive sprockets and idler drum assemblies in the entire conveyor system. It is desirable, not only for the AFC tail drive unit, but the other endless conveyors to provide a placement next to the mine wall to conserve space.

One example of addressing this lubricating problem is found in U.S. Pat. No. 5,027,940 to Woodward. This reference discloses a lubricating system in a conveyor apparatus that accommodates the lubrication of rotary conveyor members from the opposing side of the conveyor. Lubricant is communicated through a line to the opposite side of the conveyor. The hydraulic line terminates at a stationary fitting, positioned on a fixed bearing tube at the end of the rotary shaft. Once the lubricant is introduced through this stationary fitting, it is communicated through an internal cavity in the support tube and ultimately reaches the bearings.

While the Woodward reference discloses an effective way to provide remote lubrication for conveyor apparatus bearings, it has several shortcomings. Perhaps the most significant shortcoming involves retrofitability. It is readily observed that the lubrication system of the Woodward reference is only suited for applications in conveyor apparatus having a fixed or stationary bearing mounting and lubricant fitting. Otherwise, the connection between the fitting and hydraulic line could not be established. The entire rotary support assembly of this conveyor apparatus cannot be removed and easily replaced (note in FIG. 3, the welded in place bearing tube 25). Thus, the lubrication system of the Woodward invention is adaptable for use in only a limited type of situation.

Another shortcoming of the Woodward reference is the additional time required during installation of a replacement rotary support assembly. Before servicing each rotary support member, the bearings, washers, seals and retainers must be separately removed, and then reinstalled at the work site (see FIG. 3). While this step, in itself, could be performed in a relatively short amount of time in a controlled repair area, it is difficult to do especially at a working mine face. The repetition of this step for each rotary support member and/or replacement bearings and the like, over the life of the conveyor can consume an appreciable amount of time.

Accordingly, there is clearly a need to provide a more convenient and efficient lubrication system for conveyor apparatus that accommodates remote lubrication; especially for the bearings of drive sprockets/idler drum assemblies of AFC tail drive units. Also, a lubrication system is sought that minimizes the removal/installation time of the replacement drive sprocket/idler drum assemblies, while also providing a simple and cost-effective design.

SUMMARY OF THE INVENTION

It is thus a primary object of the present invention to provide a lubrication system in a conveyor apparatus for applying lubricant to a conveyor drive sprocket bearing from a convenient and efficient remote location.

Another object of the present invention is to provide a lubrication system for a conveyor drive sprocket/idler drum assembly that minimizes the chance of a mishap presented to the operator.

Still another object of the present invention is to provide a more cost effective lubrication system, representing substantial savings by reducing the time required for lubricating conveyor bearings.

It is yet another object of the present invention to provide a conveyor lubrication system having additional cost savings by utilizing a design that minimizes the time required for installation of a replacement drive sprocket/idler drum assembly and other rotary support members.

Additional objects, advantages and other novel features of the invention will be set forth in part in the description that follows and in part will become apparent to those skilled in the art upon examination of the following or may be learned with the practice of the invention. The objects and advantages of the invention may be realized and obtained by means of the instrumentalities and combinations particularly pointed out in the appended claims.

To achieve the foregoing and other objects, and in accordance with the purposes of the present invention as described herein, an improved lubrication system is provided for use in conveyor apparatus having an endless conveyor member, such as a belt or chain. The endless member, such as a chain with conveying flights found on AFC tail drive units, is driven by one or more conveyor drive sprockets. In addition to the drive sprocket assembly, support for the endless member is provided by an idler drum assembly. The following discussion of a preferred embodiment describes the lubrication system of the present invention as it relates to such an AFC tail drive unit. However, it is understood that this description, in its broadest sense, is equally applicable in describing how the present invention relates to other similar conveyor apparatus.

The lubrication system is comprised of a modified bearing housing on a drive sprocket/idler drum assembly, a modified conveyor frame, and a remote lubricate delivery conduit means. A drive sprocket assembly is illustrated that provides the motive force for circulating the endless conveyor. A central shaft rotates within a bearing at each end that is enclosed by a stationary bearing housing. Circumferentially spaced access ports are provided in the bearing housing for supplying lubricant to the bearing within.

The drive sprocket is mounted for rotation within a split conveyor frame. Each portion of the split frame defines semicircular mounting rings for closure about the bearing housing. In one of these mounting rings, an arcuate groove is provided as a part of the conduit means and extends along the surface so as to form a lubricating channel. A dam or stopper plug is included at each end of the channel to effectively confine the lubricant and prevent its escape from the channel. Further, the lubricant channel aligns with the access ports of the bearing housing. As lubricant is pressurized within the channel, it is forced through the access ports to lubricate the internal bearing.

In the preferred embodiment, the access ports are uniformly spaced so that the distance separating consecutive ports is less than half the length of the lubricant channel. In this fashion, at least two access ports coincide with the lubricant channel regardless of the orientation of the drive sprocket assembly within the conveyor frame. This advantageously saves time during installation by allowing the operator to mount the drive sprocket assembly within the conveyor frame without having to ensure any particular alignment or orientation therein.

The conduit means is also comprised of a rigid transfer tube and a lubricant passage extending through the split conveyor frame on the face side of the drive unit. The transfer tube is mounted on the conveyor frame so that it extends transversely across the conveyor. The tube is terminated on the goaf side of the drive unit by a lubricant fitting that is easily accessed by the operator for applying lubricant thereto.

In the preferred embodiment, the end of the transfer tube adjacent the face side of the drive unit is adapted for fluid communication with the lubricant passage through a lateral feed orifice in the tube that aligns with the lubricant passage. In turn, the lubricant passage extends between the feed orifice of the transfer tube and the lubricant channel. Accordingly, an operator introduces lubricant into the fitting supplied at the goaf side of the drive unit through a standard fitting attached to the transfer tube. Lubricant is then communicated through the transfer tube, the lubricant passage, and into the lubricant channel. Once the lubricant fills the lubricant channel, further pressurization applied by the operator forces the lubricant through the access ports of the bearing housing, whereby it effectively reaches and lubricates the bearing.

Still other objects of the present invention will become apparent to those skilled in this art from the following description wherein there is shown and described a preferred embodiment of this invention, simply by way of illustration of one of the modes best suited to carry out the invention. As it will be realized, the invention is capable of other different embodiments and its several details are capable of modification in various, obvious aspects all without departing from the invention. Accordingly, the drawings and descriptions will be regarded as illustrative in nature and not as restrictive.

BRIEF DESCRIPTION OF THE DRAWINGS

The accompanying drawing incorporated in and forming a part of the specification, illustrates several aspects of the present invention and together with the description serves to explain the principles of the invention. In the drawing:

FIG. 2 is a cut-away cross-sectional view of one end of the drive sprocket assembly showing the inner support shaft, bearing, bearing housing, and access ports;

FIG. 3 is a cut-away perspective view showing one end of the lubricant channel and resilient stopper plug inserted therein; and FIG. 4 is a cut-away cross-sectional view of one portion of the split conveyor frame of the drive unit on the face side showing the lubricant passage, lubricant channel, and a stopper plug.

Figure 1:
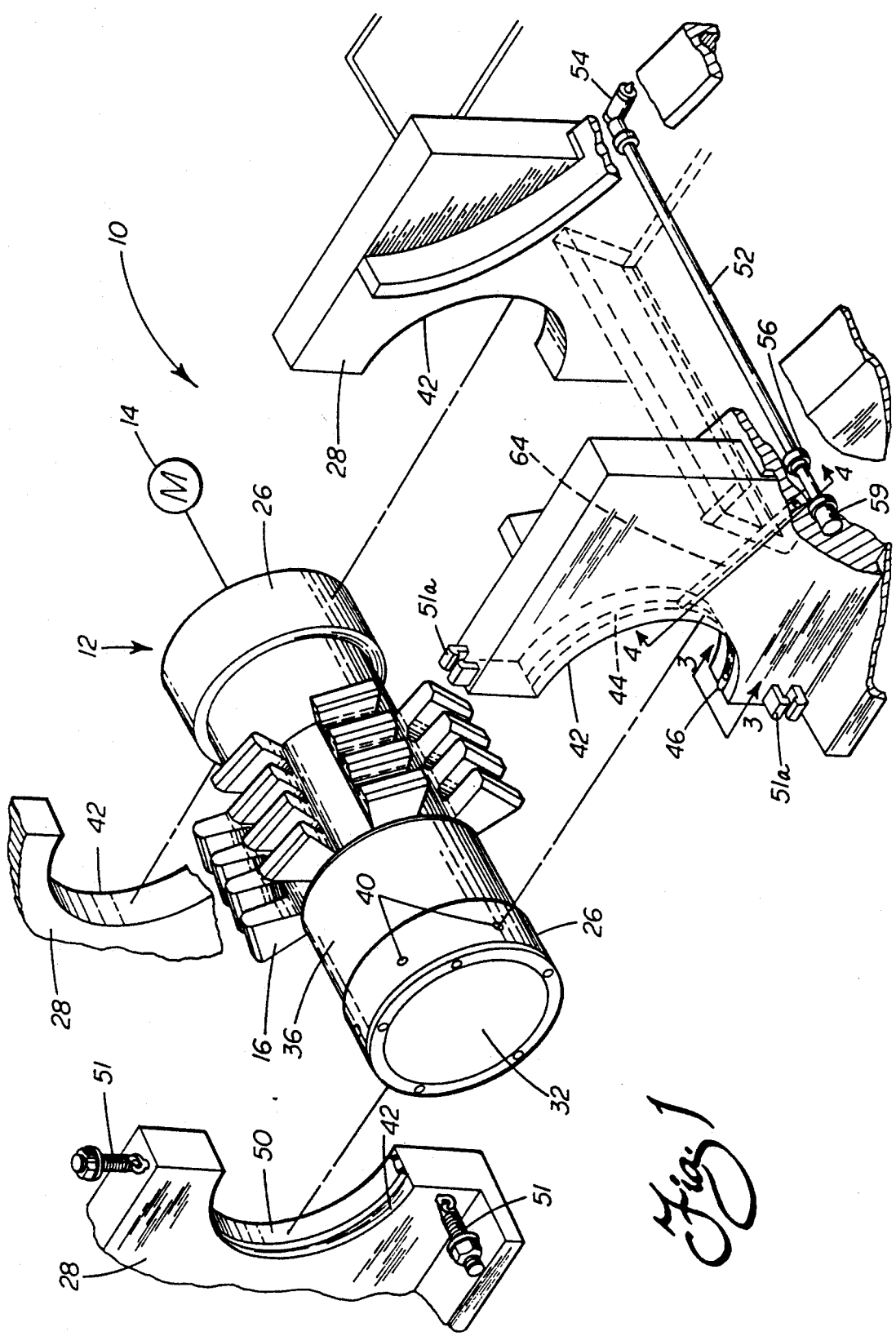
FIG. 1 is an exploded perspective view showing the entire lubrication system for use with a drive sprocket assembly in an AFC tail drive unit including a split frame.

Reference will be made in detail to the present preferred embodiment of the invention, an example of which is illustrated in the accompanying drawing.

DETAILED DESCRIPTION OF THE DRAWING

Reference is now made to the exploded view of FIG. 1, which shows a first end of a tail drive unit generally designated by reference numeral 10, including a drive sprocket assembly 12, which supplies the driving force used to circulate an endless conveyor member, such as a chain with spaced flights (not shown). A drive motor 14 supplies the motive force used to rotate the drive sprocket 16. During rotation, the sprocket teeth engage the conveyor chain in a driving fashion, so as to circulate the chain about its endless path.

The second end of the drive unit 10 is similar to the first end, except that it includes an idler drum assembly (not shown) instead of the drive sprocket assembly 16, just described. The idler drum provides non-driving support to the circulating conveyor chain. The concepts of the lubrication system of the present invention apply equally to both ends or types of drive unit 10, or similar conveyor support assemblies. Accordingly, a complete and effective understanding of the present invention can be obtained through the present disclosure, describing the lubrication system for only the drive sprocket assembly 12.

The drive sprocket assembly 12 is comprised primarily of a central drive shaft 20, that freely rotates within a bearing 24 at each end (see FIG. 2 for the face side end). The bearing 24 is received within a stationary bearing housing 26 that is mounted within a split conveyor frame 28 or the like. A retainer ring 30 fastened to the end of the drive shaft 20 clamps the bearing in place. A bearing cap 32, fastened to the bearing housing 26, seals the end of the bearing 24 in a chamber 34 containing lubricant. A conventional rotary seal 35 seals the inner side of the lubricant chamber 34. As should also be appreciated, the sprocket 16 includes a drum-like body 36, mounted on and rotatably driven with the drive shaft 20.

The lubrication system of the present invention advantageously includes access ports 40 that are circumferentially spaced around the perimeter of the bearing housing 26. Pressurized lubricant flows through these ports 40, maintaining an adequate lubricant supply within the chamber 34 and around the bearing 24 and the drive shaft 20. This ensures smooth operation of the conveyor apparatus. It also maximizes the operable lifetime of the bearing 24 and other conveyor components.

The drive sprocket assembly 12 is securely mounted within a split conveyor frame 28. The two portions of the split frame 28 define semicircular mounting rings 42 that combine to snugly grip the bearing housings 26. A first portion of the split frame 28 includes a lubricant channel 44. Specifically, the lubricant channel 44 is a groove with a semicircular cross-section extending in a substantially 180-degree arc along the inner surface of the mounting ring 42. Stopper plugs 46 (also see FIG. 3) are wedged in each end of the lubricant channel 44, and when compressed after the split frame 28 is brought together, prevent lubricant from escaping the channel 44. The lubricant channel 44 corresponds with the access ports 40 of the bearing housing 26 for supplying lubricant thereto.

As previously stated, the access ports 40 are circumferentially spaced around the bearing housing 26 and align with the lubricant channel 40. The access ports 40 are uniformly spaced so that the distance separating consecutive ports 40 is less than one-half the length of the lubricating channel 44. In this way, regardless of the orientation of the drive sprocket 12, at least two access ports 40 are in fluid communication with the lubricant channel 44. The stopper plugs 46 cause the lubricant to be trapped within the lubricant channel 44. As the lubricant becomes further pressurized, it is forced through the aligned access ports 40 for application to the internal bearing 24 (see FIG. 2).

It can be appreciated that pressurization sufficient to force lubricant through the aligning access ports 40 is also sufficient to force lubricant within the internal chamber 34 out the access ports 40 that do not align with the lubricant channel 44. Accordingly, the second or mating portion of the conveyor frame 28 conforms to the outer diameter of the bearing housing 26. To effectively seal these remaining access ports 40, a rubber strip 50, or the like, is provided along the inner surface of the mounting ring 42. In addition to sealing, the rubber strip 50 also strengthens the grip applied to the bearing housing 26, so that it does not slip or rotate within the conveyor frame 28. Suitable frame actuators/locks, such as pivot bolts/yokes 51, 51a, or including hydraulic cylinders (not shown) may be provided to draw together and lock the frame of the drive unit 10 into an integral frame.

A rigid transfer tube 52 is mounted so as to transversely extend across the conveyor frame 28. Through a lubricant fitting 54, an operator introduces lubricant into the transfer tube 52, and then it flows through the conduit means, and ultimately to the bearing 24. Of course, in lieu of a standard fitting, the lubricant can be introduced by a pressurized lubricant system (not shown). A high pressure relief valve 59 ensures that a maximum lubricant pressurization within the system is not exceeded. This advantageously allows the operator to apply lubricant through the fitting 54 without fear of overpressurizing the bearing 24. The bearing at the opposite end, or the goaf side of the drive unit 10, is separately lubricated through a separate standard fitting, since it is readily accessible.

A lateral feed orifice 60 (see FIG. 4) is provided aligned with lubricant passage 64 for fluid communication of the lubricant with lubricant channel 44 of the conveyor frame 28. In this way, lubricant is transferred from the transfer tube 52 through the feed orifice 60 and into the lubricant passage 64 and the machining and fabrication required is minimized, thus making retrofitability convenient and relatively inexpensive. The time and effort saved, in addition to the efficiency increase in operation, makes the payback time very short.

In operation, to apply the lubricant to the face side bearing 24, an operator attaches a standard lubricant gun, to the lubricant fitting 54. Lubricant is introduced through the lubricant fitting 54 into the transfer tube 52, and thence through the feed orifice 60 to the lubricant passage 64. Next, the lubricant fills the channel 44, and as the operator pressurizes the lubricant further, it is forced through the access ports 40 and into the bearing cavity 34. The operator steadily applies the lubricant until all of the voids are filled, and all of the foreign fluid, such as water, is forced out. This can be observed visually as clean lubricant is forced past the seal 35, and appears at the interface between the bearing housing 26 and the sprocket body 36 (see FIG. 2). This indicates that an adequate supply of lubricant is supplied to the internal chamber 34, but sufficient pressure relief is available past the seal so as not to trigger the high pressure release valve 59.

In summary, numerous benefits have been described which result from employing the concept of the present invention. First and foremost, the lubricating system of the present invention provides a quick and efficient way to lubricate the enclosed bearing 24 on the face side of an AFC tail drive unit 12 or the like. It provides a substantial cost savings over the former lubricating systems by reducing the initial cost of the machining and fabrication, as well as the amount of time required during the lubricating process. It provides substantial additional cost savings by effectively utilizing a symmetrical array of access ports 40 that minimize the installation time of replacement drive sprocket/idler drum assemblies.

The foregoing description of a preferred embodiment of the invention has been presented for purposes of illustration and description. It is not intended to be exhaustive or to limit the invention to the precise form disclosed. Obvious modifications or variations are possible in light of the above teachings. For example, the lubrication system of the present invention can be adapted so that the goaf side of the conveyor frame 28 can include a lubricating channel and passage in fluid communication with the same transfer tube 52. In this way, a single lubricant application by the operator at the fitting 54 lubricates the bearings 24 on both sides of the drive sprocket assembly 12, further decreasing the time required for lubrication. The embodiment was chosen and described to provide the best illustration of the principles of the invention and its practical application to thereby enable one of ordinary skill in the art to utilize the invention in various embodiments and with various modifications as in suited to the particular use contemplated. All such modifications and variations are within the scope of the invention as determined by the appended claims when interpreted in accordance with breadth to which they are fairly, legally and equitably entitled.

We claim:

1. In an assembly having a hard-to-reach rotary means supported by a bearing to be lubricated, a housing enclosing said bearing, and a fixed frame means for mounting said rotary means through said housing, a lubrication system comprising:

access ports in said housing for communicating lubricant to said bearing;

an elongated channel of predetermined length having at least two ends in said fixed frame means in fluid communication with at least one of said access ports located between said ends;

means for sealing the ports not aligned with said channel; and stationary conduit means leading to a remote location in fluid communication with said channel;

whereby lubricant is communicated through said conduit means, said channel, and at least one of said access ports for application to said bearing from a remote location.

2. The lubrication system according to claim 1, wherein said access ports are circumferentially spaced apart by a distance of shorter span than the length of said channel.

3. The lubrication system according to claim 1, wherein said conduit means includes a protective pressure relief valve for maintaining proper lubricant pressurization around said bearing.

4. The lubrication system according to claim 1, wherein said conduit means includes a transfer tube extending substantially transversely across said conveyor assembly.

5. The lubrication system according to claim 4, wherein said conduit means includes a passage extending through said fixed frame means for fluid communication between said channel and said transfer tube.

6. A lubricant system according to claim 1, wherein said channel includes a dam on each end for maintaining the lubricant therein and forcing said lubricant through said access ports and around said bearing.

7. The lubrication system according to claim 6, wherein said fixed frame means is a split frame with said channel formed in at least one part therein.

8. The lubrication system according to claim 7, wherein said dams are resilient plugs, said at least one part of said split fixed frame forms a semicircular ring for engagement with said housing and compressing the dams for sealing at approximately 180 degrees apart.

9. The lubrication system according to claim 6, wherein said housing includes access ports spaced around substantially the full perimeter of said housing.

10. The lubrication system according to claim 9, wherein said channel aligns with at least two of said access ports for fluid communication.

* * * * *